No. 754,096. PATENTED MAR. 8, 1904.
W. H. SCOTT.
DOUGH BREAK.
APPLICATION FILED OCT. 24, 1903.
NO MODEL. 6 SHEETS—SHEET 1.

Witnesses:
Inventor:
William H. Scott.
by Bakewell & Cornwall
attys.

No. 754,096. PATENTED MAR. 8, 1904.
W. H. SCOTT.
DOUGH BREAK.
APPLICATION FILED OCT. 24, 1903.
NO MODEL. 6 SHEETS—SHEET 3.

Witnesses:
Wm H Scott
Ralph Kalish

Inventor:
William H. Scott,
by Bakewell & Cornwall
attys

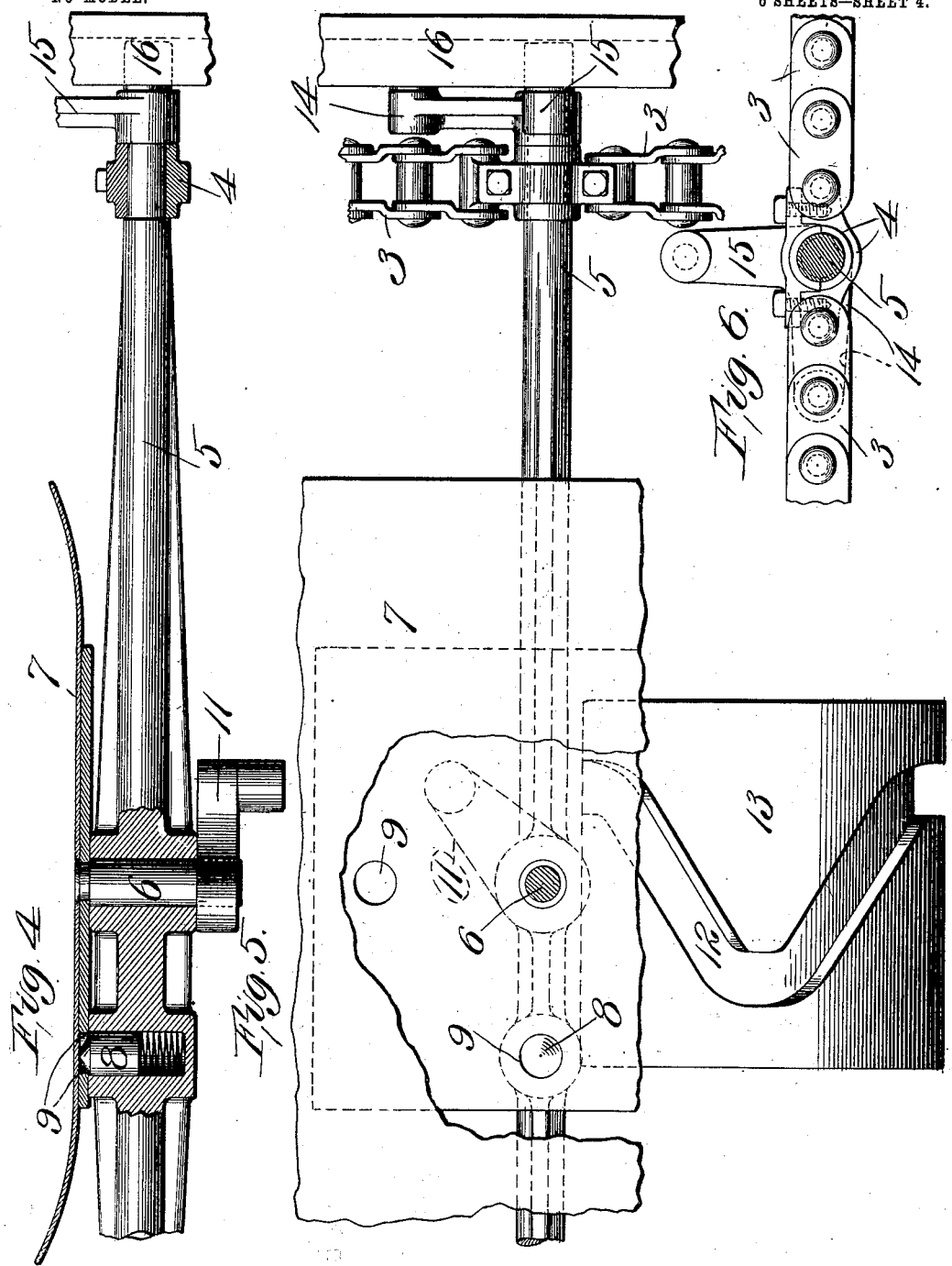

No. 754,096. PATENTED MAR. 8, 1904.
W. H. SCOTT.
DOUGH BREAK.
APPLICATION FILED OCT. 24, 1903.
NO MODEL. 6 SHEETS—SHEET 5.
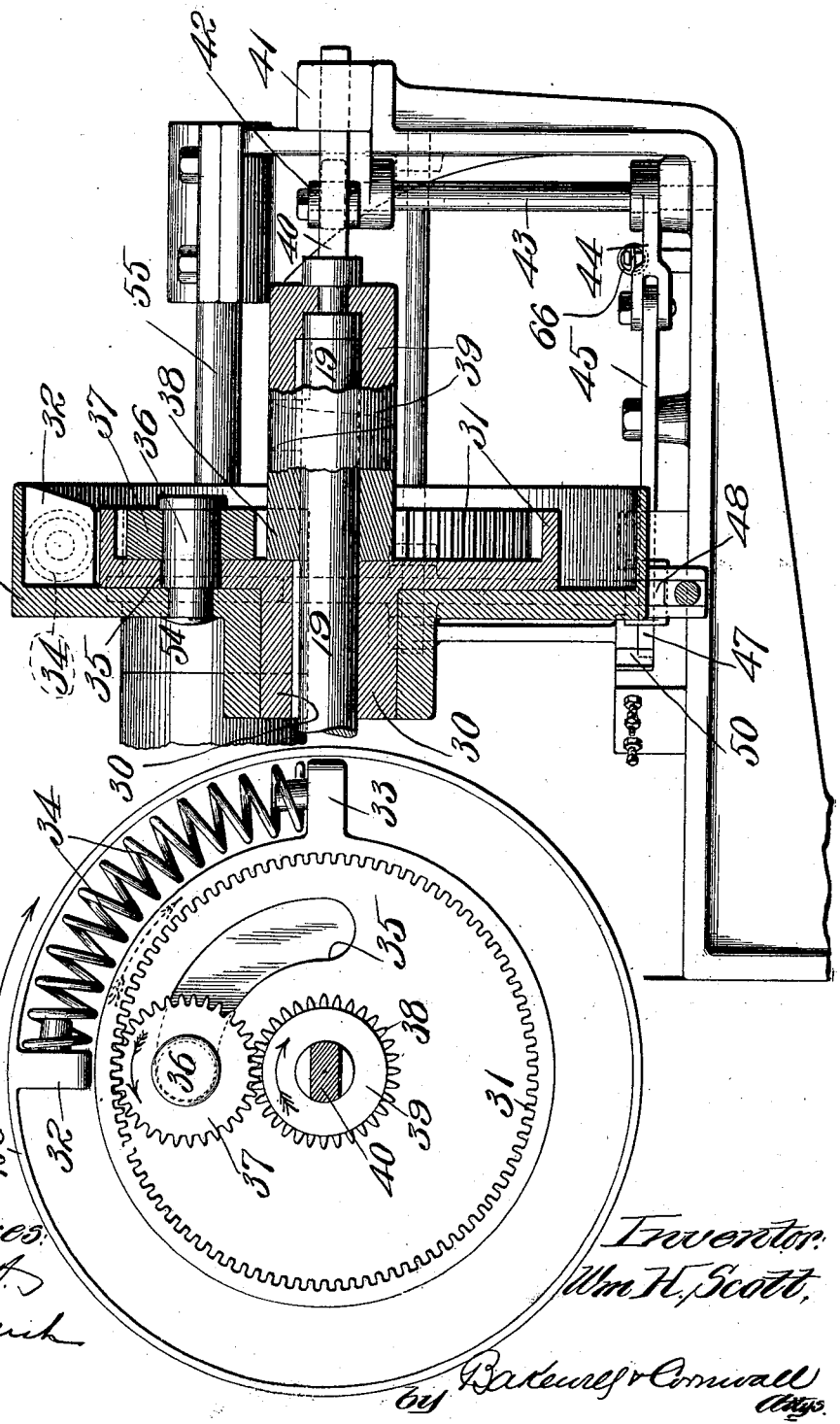

No. 754,096. PATENTED MAR. 8, 1904.
W. H. SCOTT.
DOUGH BREAK.
APPLICATION FILED OCT. 24, 1903.
NO MODEL. 6 SHEETS—SHEET 6.
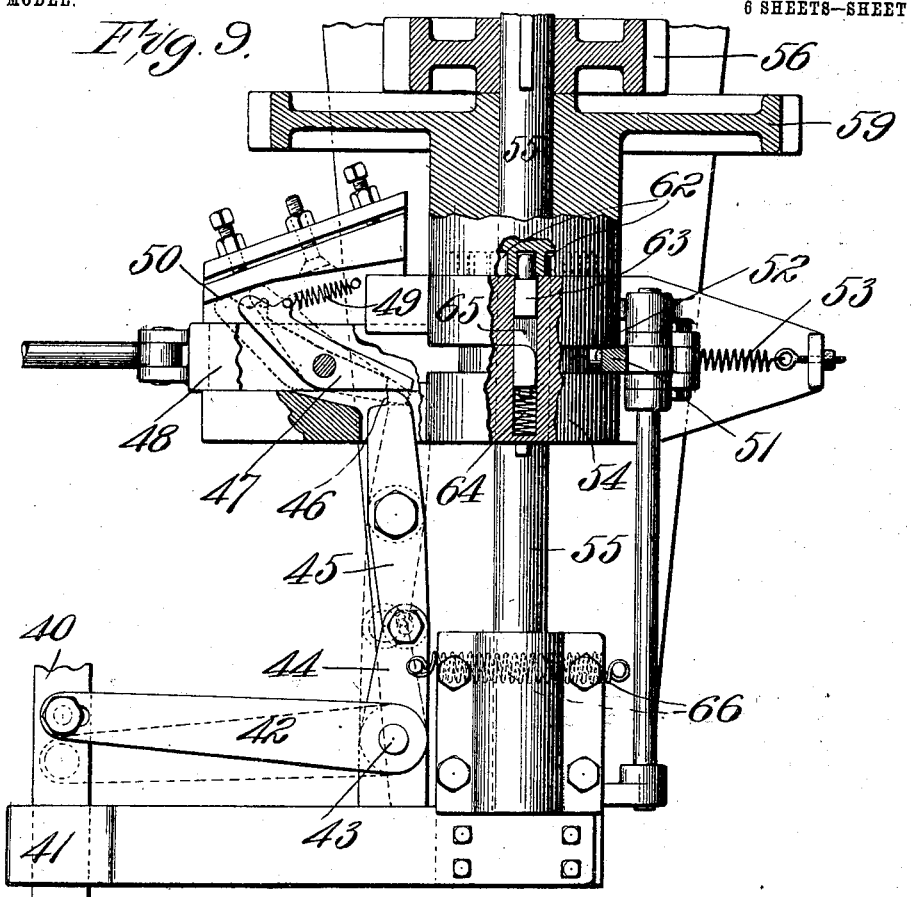
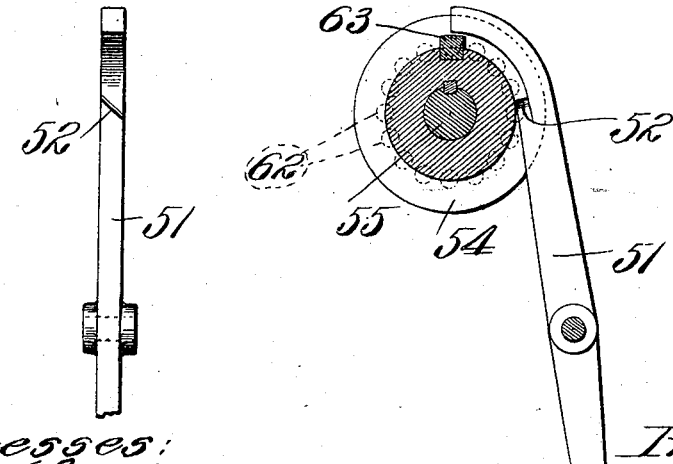
Witnesses:
Inventor:
William H. Scott
by Bakewell & Cornwall
Attys.

No. 754,096. Patented March 8, 1904.

UNITED STATES PATENT OFFICE.

WILLIAM H. SCOTT, OF ST. LOUIS, MISSOURI, ASSIGNOR OF TWO-THIRDS TO S. L. G. HYDE AND FREDERICK S. FREUND, OF ST. LOUIS, MISSOURI.

DOUGH-BREAK.

SPECIFICATION forming part of Letters Patent No. 754,096, dated March 8, 1904.

Application filed October 24, 1903. Serial No. 178,397. (No model.)

*To all whom it may concern:*

Be it known that I, WILLIAM H. SCOTT, a citizen of the United States, residing at St. Louis, Missouri, have invented a certain new and useful Improvement in Dough-Breaks, of which the following is a full, clear, and exact description, such as will enable others skilled in the art to which it appertains to make and use the same, reference being had to the accompanying drawings, forming part of this specification, in which—

Figure 1:
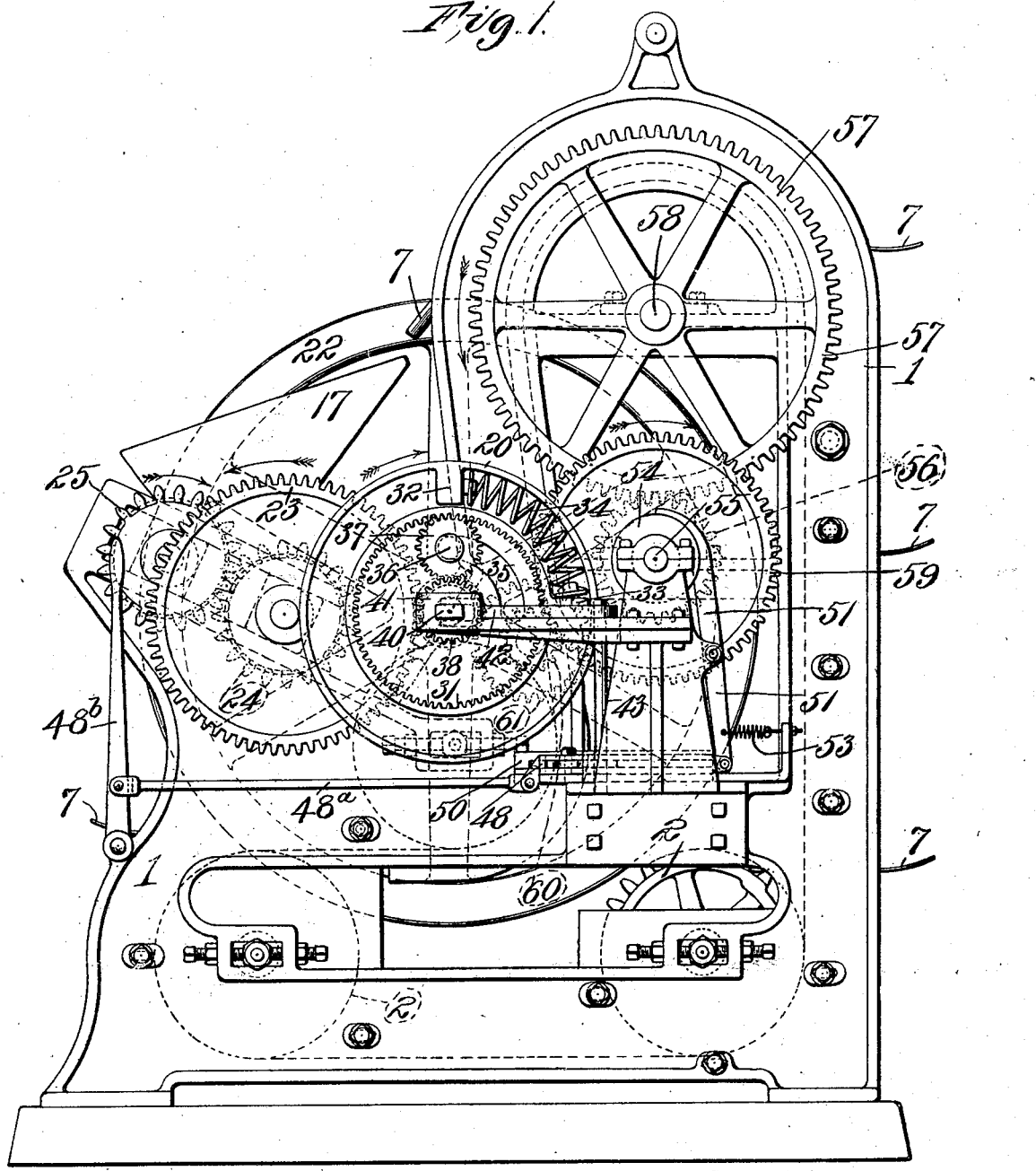
Figure 2:
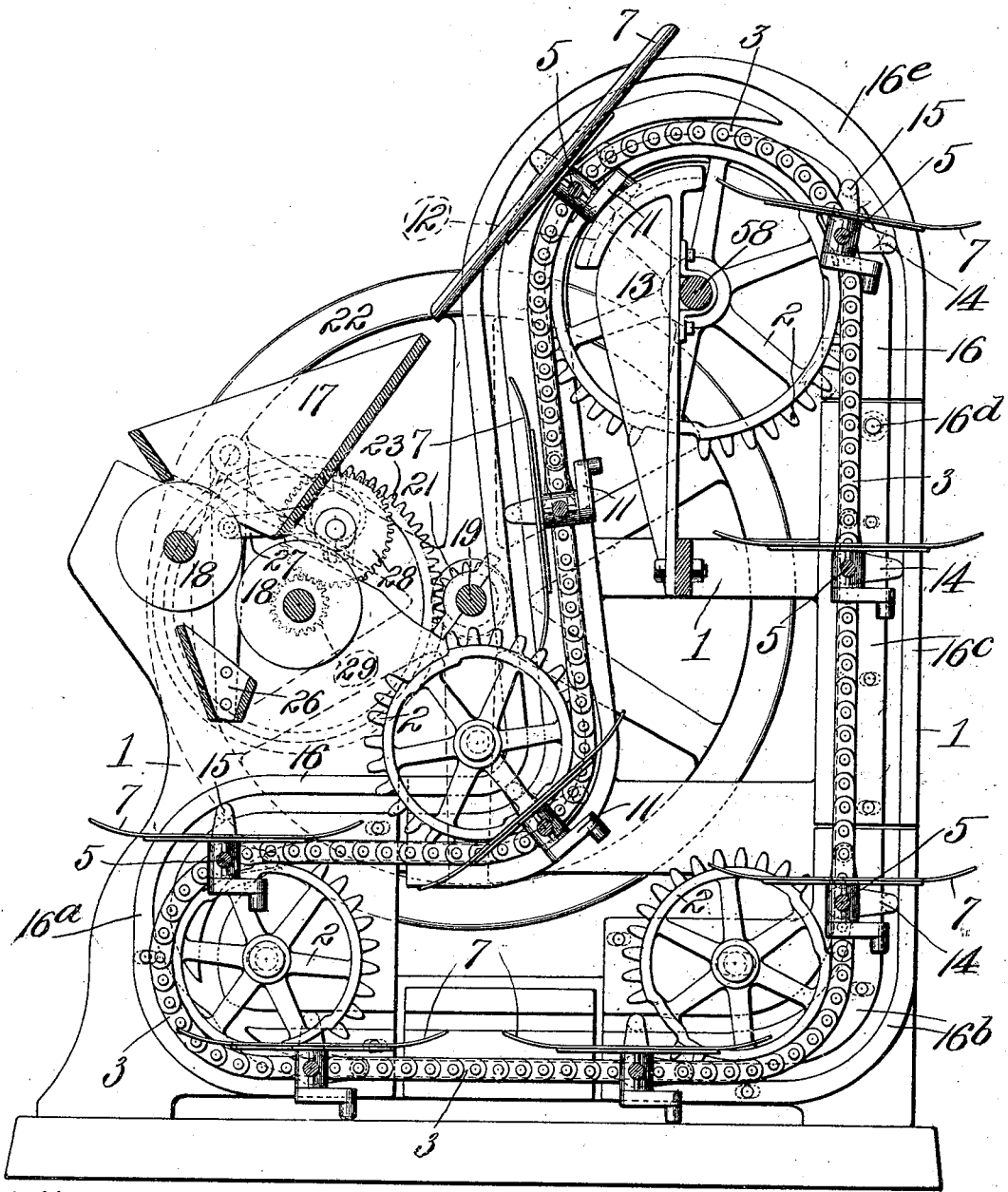
Figure 3:
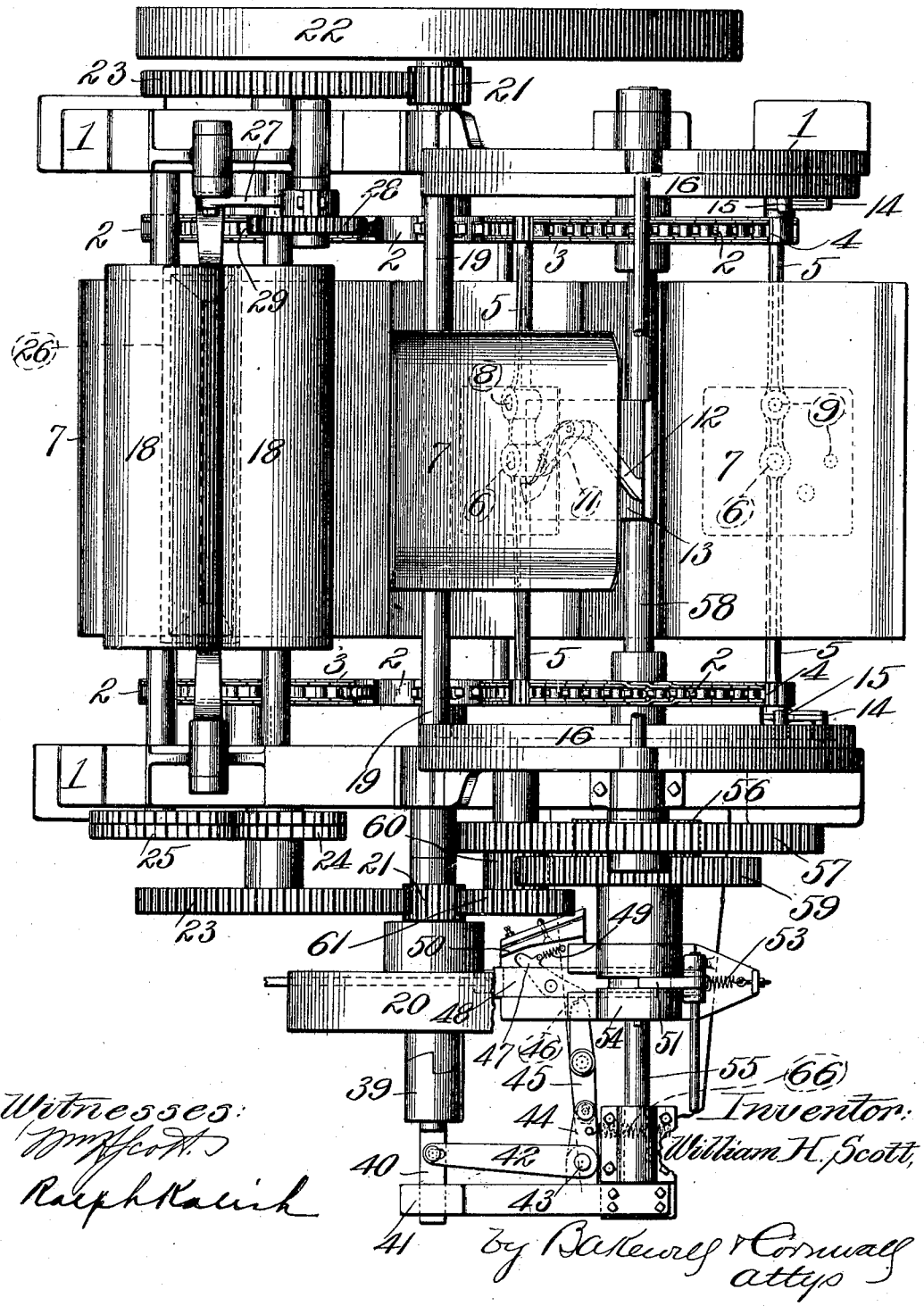

Figure 1 is a side elevational view of my improved dough-break. Fig. 2 is a vertical sectional view thereof. Fig. 3 is a top plan view. Fig. 4 is a detail view, partly in section, of one of the tray-supports. Fig. 5 is a top plan view, partly broken away, showing the manner of rotating the tray on its support. Fig. 6 is a detail view of the endless chain. Fig. 7 is a detail view of mechanism for controlling the travel of the trays, depending upon the presence or absence of the dough in the breaking-rolls. Fig. 8 is a sectional view of the same. Fig. 9 is a top plan view of a portion of said mechanism. Fig. 10 is a detail view of the clutch-operating lever, and Fig. 11 is a side elevational view showing said lever in operative position.

This invention relates to a new and useful improvement in dough-breaks for use in bakeries. The dough after being made and weighed is placed on the traveling trays, which trays are carried by endless chains. These trays are moved into dumping and receiving positions by appropriate mechanism. In approaching the dumping position the tray is given a quarter-turn and the dough is dumped between the break-rolls, and after passing through the break-rolls the dough is folded over onto a receiving-tray, which receiving-tray is then carried onward in the circuit. In the machine shown there are nine trays, five of which contain dough, while two of the remaining trays are in operative position, one dumping a batch of dough and the other receiving the dough, the two remaining trays being idle during this operation.

Means are provided for automatically throwing the mechanism which drives the endless chain out of gear when the break-rolls are acting upon the dough, and in this manner the trays remain stationary during the period that the dough is passing through the break-rolls, and the instant the dough leaves the break-rolls the endless chains start on their travel to move and now turn to discharge another load onto the break-rolls, and an empty tray comes into position beneath the break-rolls to receive the dough as it passes through the break-rolls.

My invention consists in the novel construction, arrangement, and combination of the several parts, all as will hereinafter be described, and afterward pointed out in the claims.

In the drawings, 1 indicates the side framing of the machine, preferably in the form of castings, in which are provided the bearings for the several moving parts.

I will first describe the construction of the endless chain, the trays carried thereby, and the means for giving a quarter-turn to each tray as it approaches its dumping position.

Referring to Fig. 2, mutilated chain-sprocket wheels 2 are mounted on shafts in the side framing, there being two pairs of said mutilated sprockets at the lower portion of the casting, a third pair being employed to deflect the chain to avoid the break-rolls, and a fourth pair being arranged at the upper portion of the machine. 3 indicates the chains which pass over these sprockets, said chains being preferably of ordinary construction, such as can be purchased in the open market, and these chains have one or more links removed at intervals for the reception of castings 4, (see Fig. 6,) which provide bearings for a rock-shaft 5, extending from one chain to the other. This rock-shaft has a bearing in its center (see Fig. 4) for the reception of a pivot-stud 6, extending from the under side of the tray 7. This tray preferably has two of its side edges slightly bent or curved in an upward direction. A spring-pressed pin 8 is mounted in the rock-shaft 5 and coöperates with depressions or openings 9 in the bottom of the tray 7, whereby when the tray is moved from one of its positions to another it will be held in its new position against accidental displacement.

The lower end of the pivot-stud 6 carries a crank-arm 11, whose roller coöperates with a cam-groove 12, arranged in the upper face of a bracket 13, mounted in position in the frame. By this construction it will be obvious that as the trays pass the cam-groove the crank-arm 11 will enter said groove, and as its roller approaches the high part of the groove it will force the tray to make a quarter-turn, which may be designated as the "dumping" position of the tray, and then by passing through the remaining portion of the groove the crank-arm will restore the tray to its original position, where it is held by pin 8. In this connection it will be observed that the roller on the crank-arm 11 is moved to a position to again enter the groove 12 after making another circuit.

The means for tilting the trays when in dumping position and for maintaining said trays in a horizontal position during the time they are loaded comprises crank-arms 14 and 15, arranged on the ends of the rock-shafts 5. These arms are preferably arranged at right angles to each other in the form of a bell-crank lever and are provided with rollers at their extremities which enter grooves in a cam-track 16, extending around the entire circuit. It will be observed by referring to Fig. 2, starting from the receiving position wherein the tray is located under the break-rolls, that the downward movement of said tray will necessitate the crossing of the grooves in the track-plate 16 in order to maintain the tray in a horizontal position. This position is maintained throughout the circuit until the tray approaches the upper portion of the machine, when the cam-grooves again cross and are so related that as the tray is given a quarter-turn because of the coöperation of the crank-arm 11 and cam-groove 12 the cranks 14 and 15 will rock the shaft 5, causing it to tilt its carried tray, as shown in Fig. 2. When the tray is restored to its normal position rotatably, the continued downward movement will, because of the relation of the grooves in plate 16, cause the tray to keep substantially a vertical position, because the tray in this position is idle, and as the tray is brought beneath the break-rolls it is again made to assume a horizontal position to receive the dough coming from the break-rolls.

In order to take up any slack in the endless chains which might result from wear or other causes, I adjustably mount the cam-plates $16^a$ and $16^b$ at the lower portion of the machine by elongating the openings through which the securing-bolts pass, and in order to aline the horizontally-adjusted section $16^b$ with a vertically-disposed section $16^c$ I pivot the latter section at $16^d$, so as to maintain the relation of the upper ends of these grooves with the fixed section $16^e$, the lower portion of $16^c$ being adjustable to aline these grooves with the horizontally-adjusted section $16^b$.

The bearings of the sprocket-wheels over which the endless chains pass are also made adjustable for obvious reasons. The dough discharged from the tilted tray in its dumping position is received into a hopper 17, whence it is delivered between the break-rolls 18. These break-rolls are driven by appropriate gearing, as follows: 19 indicates a drive-shaft on which is arranged a driving-pulley 20. This shaft carries pinions 21 and a balance-wheel 22. Pinions 21 mesh with gears 23, arranged on the ends of the shaft, upon which one of the break-rolls 18 is mounted, which shaft carries pinions 24, meshing with pinions 25 on the shaft of the other break-roll, whereby the other break-roll is rotated in the opposite direction.

In order to fold the dough, which issues in sheet form from between the break-rolls, I arrange an oscillating folder 26 under the break-rolls, (see Fig. 2,) which folder is mounted on swinging arms, preferably pivoted to brackets extending from the side framing. A link 27 is connected to one of these pivoted arms, which link terminates in an eccentric-strap arranged upon an eccentric fixed to a short shaft journaled in a bearing on the side framing, which shaft is driven by a gear 28, meshing with a pinion 29 on the shaft of one of the break-rolls.

It is obvious that dough dumped onto the break-rolls will consume some time in passing therethrough, and, further, that the receiving-tray must remain stationary under the break-rolls until the batch of dough under treatment by the rolls has entirely passed through the rolls. Various means may be employed for controlling the travel of the trays depending upon the presence or absence of dough in the break-rolls, and I have shown one form of mechanism for automatically accomplishing this, which mechanism depends for its action upon the resistance encountered by the break-rolls in acting upon a batch of dough passing therethrough. By referring to Figs. 7 and 8 it will be seen that the driving-pulley 20 is loosely mounted on a hub 30 of an internal gear 31. Lugs 32 and 33 are arranged, respectively, on the inner periphery of the pulley 20 and the outer periphery of the internal gear 31, between which lugs is arranged a compression-spring 34. The strength of this spring is such that when there is no dough between the break-rolls the lugs 32 and 33 are kept their greatest distance apart; but the instant that dough is introduced between the break-rolls the resistance encountered by the rolls imposes a load on the spring, which causes the lugs to approach each other. This yielding drive and the lost motion resulting from the circumferential advance of the driving-pulley with respect to the internal gear when the break-rolls meet resistance is utilized to set in action the mechanism which throws the driving-gear for the endless chains out of mesh. Internal gear 31 is provided with a slot 35, through which passes a stud 36, extending from the driving-pulley 20. This stud carries a pinion 37, in mesh with the teeth of the internal gear and also a pinion 38, loosely mounted on the shaft 19. Starting from the position shown in Fig. 7, if dough is introduced between the break-rolls the spring 34 will be compressed, causing the driving-pulley to advance with respect to the internal gear, and this advance rotates the pinion 37 in the direction of the arrow, said rotation being communicated to the pinion 38 in the direction of the arrow. The hub of pinion 38 has its end formed with cam-faces, which coöperate with corresponding cam-faces formed on the end of a sleeve 39, feathered on shaft 19 and movable longitudinally said shaft. Sleeve 39 coöperates with a headed bar 40, which bar has its outer end formed non-circular and which non-circular portion is guided in a block 41. This sliding bar has a rock-arm 42 connected thereto, (see Fig. 3,) said rock-arm being mounted on a shaft 43, whose lower end carries a rock-arm 44. Rock-arm 44 is connected to one end of lever 45, the other end of said lever 45 being provided with a shoulder 46, (see Fig. 9,) which shoulder coöperates with a pivoted dog 47, mounted upon a sliding block 48. A spring 49 tends to hold the dog down against the end of lever 45, and a cam-face 50 in the path of movement of said dog tends to raise the dog out of engagement with said lever 45.

Referring to Fig. 1, it will be seen that the sliding block 48 is connected at its rear end to a lever 51, which lever has a beveled edge 52, normally held in a clutch-groove by means of a spring 53.

54 indicates the driven member of a clutch, which is in the form of a collar, having a circumferential groove for the reception of the lever 52. This collar is keyed to the shaft 55, which shaft also has keyed thereon a pinion 56, in mesh with the gear 57 on a shaft 58, carrying the pair of sprocket-wheels 2 at the upper portion of the machine.

59 indicates a gear loosely mounted on shaft 55 and which is in mesh with a pinion 60, whose conjoined gear 61 is in mesh with the pinion 21. In this way gear 59 is constantly driven and forms the driving member of the clutch. The hub of gear 59 (see Fig. 9) is provided with a series of openings 62, in which is designed to be received the end of a sliding bar 63, said bar being pressed into one of the openings 62 by means of a spring 64. This bar traverses the circumferential groove in the driven member of the "clutch" or "collar" 54, as it has been called, and said bar is provided with a recess 65, which coöperates with the beveled face 52 of the lever 51.

The operation of the mechanism just above described is as follows: When the driving-pulley 20 advances with respect to the internal gear 31, the gear 38 is rotated and through its cam-face forces collar 39 outwardly on shaft 19. This motion through the rock-arms 42 and 44, which are connected by the shaft 43, rocks the lever 45. When the dough passes the break-rolls and the spring 34 separates the lugs 32 and 33, the gears 37 and 38 will be reversely rotated to cause the collar 39 to slide inwardly on the shaft, this motion resulting from the action of a spring 66, connected to the rock-arm 44. This restoration of the parts above described will cause the lever 45 to move from its dotted position to the position in full lines, and this movement will force the dog 47 and its sliding block 48 forwardly, so as to move the lever 51 out of its groove and permit the clutch-bolt 63 to lock the driving and driven members of the clutch. When the clutch becomes locked, the trays will be caused to travel. During this travel and immediately after the lever 51 has permitted the clutch to move into an operative position the end of dog 47 engages the inclined face 50 and moves the dog out of engagement with the shoulder on lever 45. Spring 53 now asserts itself and restores the upper end of the lever 51 into position in its groove. In assuming this position, which is the normal position of lever 51, the clutch-bolt will be operated after having made one revolution, which revolution is sufficient to advance the trays the distance of one step in their progress. In this manner it will be seen that the machine is entirely automatic, that the batch of dough is given a quarter-turn just before it is dumped onto the break-rolls, that the resistance offered by the dough to the movement of the break-rolls controls the travel of the chains, and that the presence of the dough in the break-rolls causes the trays to be arrested, and the absence of the dough causes the trays to be advanced one step.

In Fig. 1 I have shown a link 48ª, connected to the sliding block 48 and to an operating-handle 48ᵇ. By this means the clutch can be manually operated and permit the trays to travel. In operating the clutch by hand it is obvious that if it is desired to arrest the next tray in its next position the handle will have to be released to permit the lever 51 to occupy its normal position in the annular groove of the collar.

As it is necessary to use flour on the pans to prevent the dough from sticking, it is obvious that this flour can be dusted on the pans by hand or, if desired, a duster can be so arranged with respect to the pans that the flour will be dusted thereon. I have not deemed it necessary to show any mechanism for dusting the pans, as this forms no part of my invention.

I am aware that minor changes in the construction, arrangement, and combination of the several parts of my device can be made and substituted for those herein shown and described without in the least departing from the nature and principle of my invention.

Having thus described my invention, what I claim, and desire to secure by Letters Patent of the United States, is—

1. In a dough-break, the combination with break-rolls, of an endless chain, trays carried by said chain, and means for tilting said trays to dump the dough onto the break-rolls; substantially as described.

2. In a dough-break, the combination with break-rolls, of an endless chain, trays carried by said chain, and means for partially rotating said trays when in the dumping position over the break-rolls; substantially as described.

3. In a dough-break, the combination with break-rolls, of an endless chain carrying rock-shafts, trays pivotally mounted on said rock-shafts, means for rocking said shafts to tilt the trays to a dumping position, and means for rotating said trays as they approach their dumping position; substantially as described.

4. In a dough-break, the combination with break-rolls, of endless chains passing over sprockets, rock-shafts carried by said chains, crank-arms on the ends of said shafts, and continuous cam-grooves coöperating with said crank-arms to rock the shafts and tilt the trays; substantially as described.

5. In a dough-break, the combination with break-rolls, of endless chains, trays carried by said chains, and means for holding said trays in a horizontal position from the time they leave a point under the break-rolls up to the time that said trays reach a point above said break-rolls, when said means tilt said trays to a dumping position; substantially as described.

6. In a dough-break, the combination with break-rolls, of endless chains, trays carried by said chains, means for holding said trays in a horizontal position from the time they leave a point under the break-rolls up to the time they reach a point above said break-rolls, said means tilting said trays to a dumping position when above the break-rolls, and other means for operating said trays in their dumping position for imparting a partial rotation thereto; substantially as described.

7. In a dough-break, the combination with break-rolls, of traveling trays designed to move into and out of position above and below said break-rolls, means for tilting said trays to dump the dough onto the break-rolls when said trays are above said break-rolls, and means for folding the dough onto the receiving-tray under the break-rolls; substantially as described.

8. In a dough-break, the combination of traveling trays with means for tilting said trays when at a point above the break-rolls, means for partially rotating said trays when approaching a dumping position, and means for folding the dough onto the receiving-tray under the break-rolls; substantially as described.

9. In a dough-break, the combination with break-rolls, of traveling trays whose path of movement is above and below said break-rolls, means for tilting and partially rotating said trays at a point above the break-rolls, said means restoring said trays to normal horizontal position and maintaining said horizontal position throughout their circuit, and a spring-pressed pin coöperating with the trays to yieldingly hold them against accidental displacement; substantially as described.

10. In a dough-break, the combination with break-rolls, of endless chains, whose links at intervals are replaced by bearings, rock-shafts mounted in said bearings, crank-arms on the ends of said rock-shafts operating in continuous grooves in cam-plates, a tray pivotally mounted upon said rock-shaft, means for holding said tray in rotatably-adjusted position, and means for partially rotating said trays; substantially as described.

11. In a dough-break, the combination with side frame-castings of break-rolls mounted therein, sprocket-wheels mounted in said frame-plates, endless chains passing over and under said sprocket-wheels, rock-shafts carried by said endless chains, trays on said rock-shafts, crank-arms on the ends of said shafts, said crank-arms having cam-rollers at their ends, a sectional cam-plate having continuous cam-grooves for coöperating with said rollers, and means for adjusting certain of the sections of said cam-plate; substantially as described.

12. In a dough-break, the combination with side frame-castings, of break-rolls, endless chains carrying rock-shafts, crank-arms on said rock-shafts, and a cam-plate comprising a fixed section 16$^e$, horizontally-adjustable sections 16$^a$ and 16$^b$ and a swinging section 16$^c$, all of said sections being provided with cam-grooves for receiving rollers on the ends of said crank-arms; substantially as described.

13. In a dough-break, the combination with break-rolls, of traveling trays adapted to discharge a batch of dough onto the break-rolls and receive the dough from the break-rolls, and automatic means for arresting the travel of the trays during the time that a batch of dough is passing through the break-rolls; substantially as described.

14. In a dough-break, the combination with break-rolls, of traveling trays adapted to discharge a batch of dough onto the break-rolls and receive the dough from the break-rolls, and means operated by the resistance encountered by the break-rolls acting upon the dough for causing the arrest of the trays during the time that dough is passing through the break-rolls; substantially as described.

15. In a dough-break, the combination with break-rolls, of trays adapted to travel above and below said break-rolls, means for tilting said trays to discharge a batch of dough onto the break-rolls, means for partially rotating said trays as they approach a dumping position, means for folding the dough as it issues from between the break-rolls onto the receiving-tray, and means operated by the resistance to the movement of the break-rolls in acting upon the dough for causing the arrest of said trays during the time that the break-rolls are acting upon the dough; substantially as described.

16. In a dough-break, the combination with break-rolls, of trays adapted to travel above and below said break-rolls, one tray discharging a batch of dough onto the break-rolls and another tray receiving said dough as it issues from the break-rolls, and automatic means set in operation when the batch of dough passes through the break-rolls for causing the travel of the trays; substantially as described.

17. In a dough-break, the combination with break-rolls, of traveling trays for discharging a batch of dough onto said break-rolls and receiving the dough as it issues from said break-rolls, and automatic mechanism set in operation when the break-rolls have finished acting upon a batch of dough for causing the trays to be advanced one step; substantially as described.

18. In a dough-break, the combination with constantly-driven break-rolls, of traveling trays adapted to discharge a batch of dough onto the break-rolls and receive the dough from said break-rolls, driving mechanism for the trays, a clutch for rendering said driving mechanism effective, and automatic means operated by the break-rolls when acting on a batch of dough for throwing said clutch out of operative position; substantially as described.

19. In a dough-break, the combination with constantly-driven break-rolls, of traveling trays coöperating therewith, driving mechanism for said trays, a clutch for rendering said driving mechanism operative, and means actuated by the break-rolls when acting upon a batch of dough for operating said clutch to throw the same into operative position when a batch of dough has passed through the break-rolls, said clutch being automatically thrown out of gear after moving the trays a predetermined distance; substantially as described.

20. In a dough-break, the combination with break-rolls, of means for constantly driving the same, trays coöperating with said rolls, and means for automatically driving said trays a predetermined distance, said driving means being controlled by the resistance encountered by the break-rolls in acting upon a batch of dough; substantially as described.

21. In a dough-break, the combination with break-rolls, of means for constantly driving the same, said means including a shaft, an internal gear mounted on said shaft, a driving-pulley having a yielding connection with said internal gear, and a clutch which is thrown into and out of operative position by the changed relation of the driving-pulley and internal gear; substantially as described.

22. In a dough-break, the combination with break-rolls, of driving mechanism therefor including a shaft, an internal gear fixed on said shaft, a driving-pulley loosely mounted on said shaft, and driving the same through the interposition of a yielding medium, trays coöperating with the break-rolls, driving mechanism for said trays, and means for throwing said tray-driving mechanism into and out of gear, said means being controlled by the relation between the internal gear and driving-pulley; substantially as described.

23. In a dough-break, the combination with break-rolls, of driving mechanism therefor including the shaft, an internal gear fixed on said shaft, a driving-pulley loosely mounted on said shaft, and driving the same through the interposition of a yielding medium, a collar slidingly mounted on said shaft, and means for sliding said collar along the shaft when the driving-pulley is displaced with respect to the internal gear, trays coöperating with the break-rolls, driving mechanism for said trays, and means for throwing said tray-driving mechanism into and out of gear, said means being controlled by the position of the sliding collar on the shaft; substantially as described.

24. In a dough-break, the combination with break-rolls, of trays coöperating therewith, means for constantly driving the break-rolls, means for intermittently driving trays, said last-mentioned means including the driving-pulley, gearing yieldingly connected with the driving-pulley, collars slidingly mounted on the shaft and movable in one direction when the gearing is operated a certain way, a spring for moving the collar in the opposite direction when the gearing is reversed, and a clutch mechanism for controlling the intermittent drive of the trays, which clutch mechanism is thrown into and out of operative position by the movement of said collar; substantially as described.

25. In a dough-break, the combination with break-rolls, of means for constantly driving same, traveling trays for discharging a batch of dough onto said break-rolls and receiving the dough as it issues from said break-rolls, driving mechanism for the trays, a clutch for throwing said driving mechanism into and out of gear, and means for automatically operating said clutch; substantially as described.

26. In a dough-break, the combination with break-rolls, of trays coöperating therewith, means for driving said trays, a clutch for throwing said driving mechanism into and out of gear, a lever for normally holding said clutch in operative position, and means for vibrating said lever; substantially as described.

27. In a dough-break, the combination with break-rolls and their driving mechanism, of trays and their driving mechanism, a clutch for throwing the tray-driving mechanism into and out of operation, a lever coöperating with said clutch, a sliding block for moving said lever, a tripping-dog on said sliding block, a lever coöperating with said dog, and means for operating said last-mentioned lever, which means are controlled by the resistance encountered by the break-rolls acting upon a batch of dough; substantially as described.

28. In a dough-break, the combination with break-rolls and their driving mechanism, of trays and their driving mechanism, a clutch for rendering the tray-driving mechanism operative or inoperative, a lever for normally holding said clutch in an inoperative position, a sliding block for operating said lever, a dog carried by said block, means for tripping said dog, a lever for moving the dog, sliding block and lever in one direction until the dog is tripped so as to become disengaged from said lever, a spring for returning said parts to normal position, and means for operating the dog-actuating lever, said means being controlled by the presence or absence of dough between the break-rolls; substantially as described.

In testimony whereof I hereunto affix my signature, in the presence of two witnesses, this 20th day of October, 1903.

WILLIAM H. SCOTT.

Witnesses:
GEORGE BAKEWELL,
LENORE WILSON.